May 4, 1954 — W. C. JOHNSON ET AL — 2,677,460
MULTIUNIT PACKAGE
Filed Nov. 5, 1949 — 4 Sheets-Sheet 2
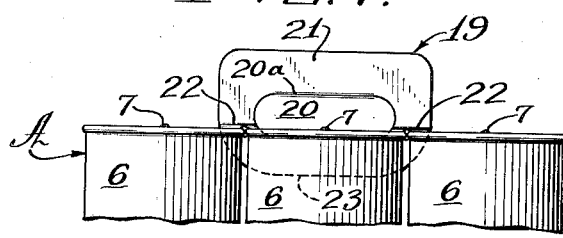
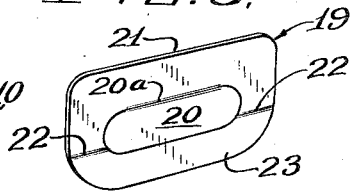
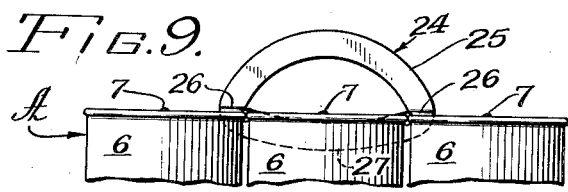
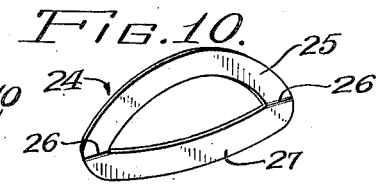
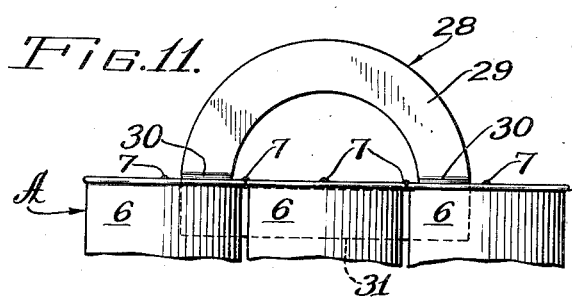
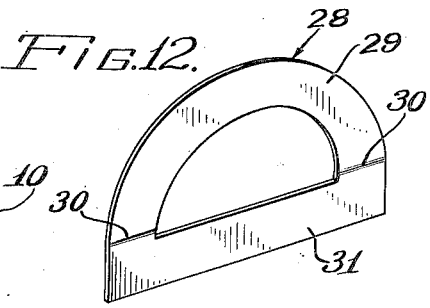
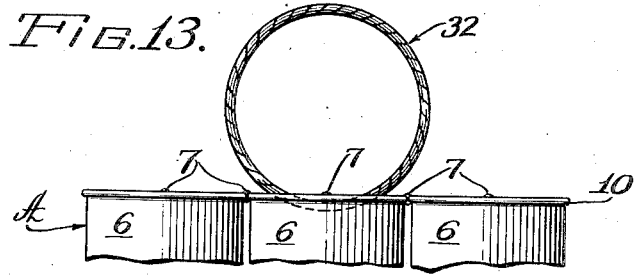
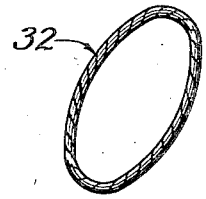
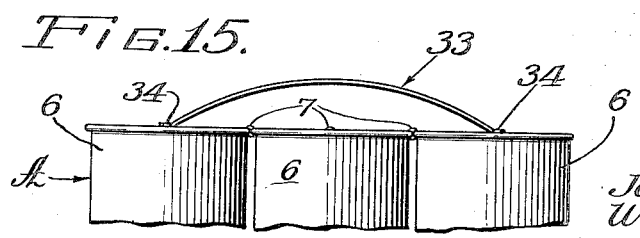
Inventors:
John J. P. Odell
Walfred C. Johnson
By Lee J. Gary
Atty.

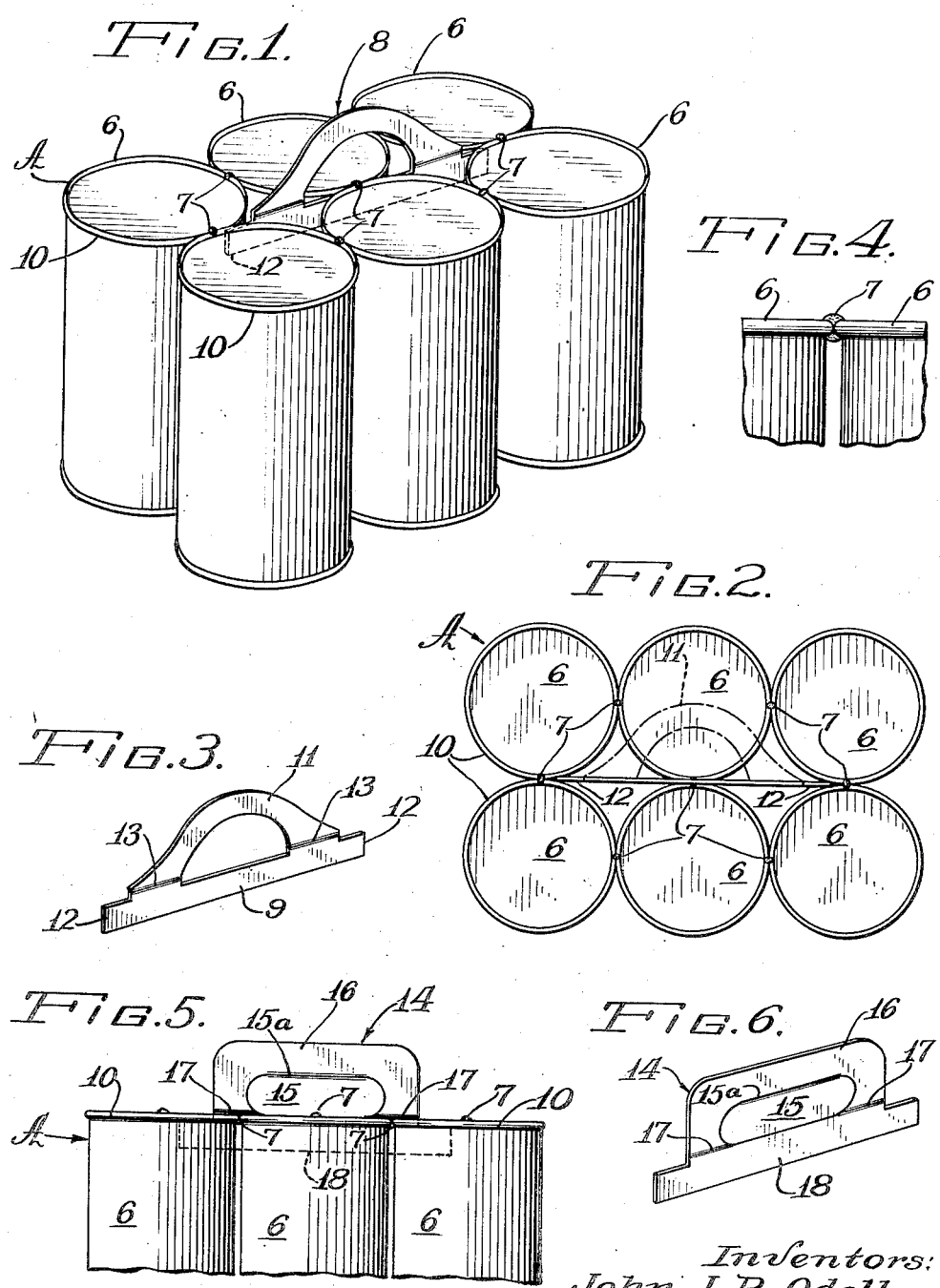

May 4, 1954     W. C. JOHNSON ET AL     2,677,460
MULTIUNIT PACKAGE

Filed Nov. 5, 1949     4 Sheets-Sheet 3

Inventors:
John J. P. Odell
Walfred C. Johnson
By Lee J. Gary Atty.

May 4, 1954  W. C. JOHNSON ET AL  2,677,460
MULTIUNIT PACKAGE
Filed Nov. 5, 1949  4 Sheets-Sheet 4
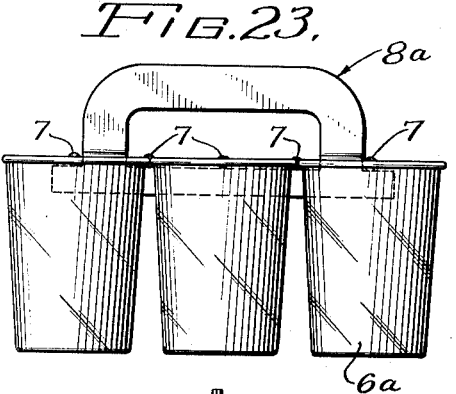
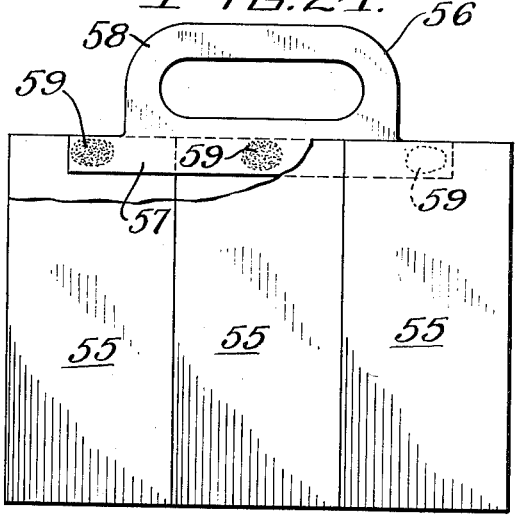
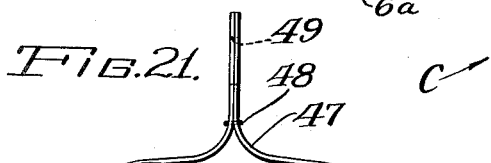
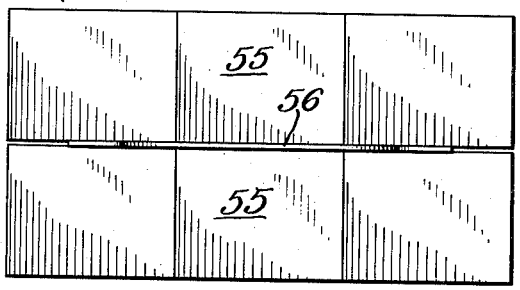
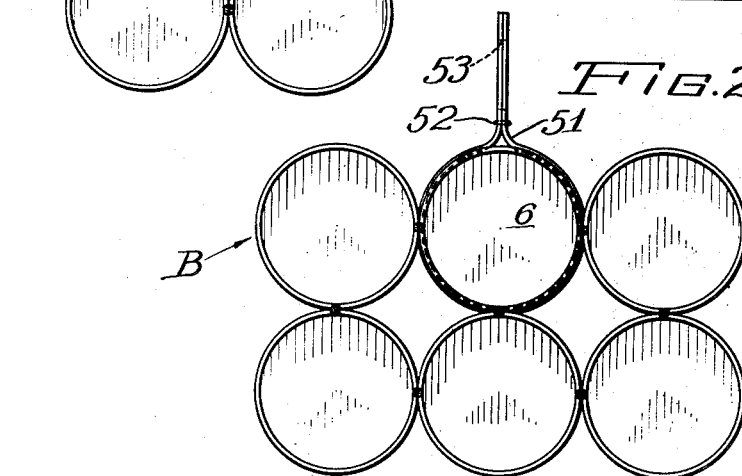
Inventors:
John J. P. Odell
Walfred C. Johnson
By Lee J. Gary Atty.

Patented May 4, 1954

2,677,460

UNITED STATES PATENT OFFICE 2,677,460

MULTIUNIT PACKAGE

Walfred C. Johnson and John J. P. Odell,
Chicago, Ill.

Application November 5, 1949, Serial No. 125,796

7 Claims. (Cl. 206—65)

1

This invention relates to the packaging of containers, and is more particularly concerned with the provision of a package comprising a plurality of individually sealed containers connected together at or adjacent their contacting marginal edges by a rupturable bond, the package of united containers being provided with a suitable handle adapted for use by customers in supporting and carrying the package from a store to their home.

It has heretofore been the practice of employees of stores to insert individual packages of food, paint or other items within paper bags for delivery to homes. It will be appreciated that this method of packaging is not satisfactory as paper bags are not usually made sufficiently strong to support the weight of relatively heavy individual packages or containers. It will also be appreciated that the use of paper bags in stores for the packaging of merchandise involves a considerable cost to the operators of the stores. The present invention contemplates the provision of means for securing a group of individually sealed packages or containers together to form a single unit package having attached thereto a supporting handle formed of cardboard, plastic, heavy twine, wire or other flexible material having sufficient strength to support the weight of the unit package.

This invention further contemplates the provision of a plurality of containers having their rims or portions adjacent thereto in contacting engagement and secured together at these points of contact to form a single multi-unit package capable of being supported by means of a handle connected thereto.

This invention further contemplates the provision of a handle adapted to be secured to a multi-unit package by the manufacturer of the packages, and adapted to be folded into a common plane with a surface of the multi-unit package during storage or shipment.

This invention embodies other novel features, details of construction and arrangement of parts which are hereinafter set forth in the specification and claims, and illustrated in the accompanying drawings, wherein:

Fig. 1 is a perspective view illustrating the manner in which containers may be arranged and secured together at their rim portions to form a multi-unit package having a handle engaged thereto.

Fig. 2 is a top plan view of same, illustrating in dotted outline the manner in which the handle may be folded against the package.

Fig. 3 is a detail perspective view of the handle.

2

Fig. 4 is a detail view illustrating the manner in which the contacting rim portions of a pair of adjacent containers may be secured together to form a rupturable bond.

Fig. 5 is a side elevational view showing a multi-unit package provided with a modified form of handle.

Fig. 6 is a detail perspective view of the handle shown in Fig. 5.

Fig. 7 is a fragmentary side elevational view showing a multi-unit package provided with another modified form of handle.

Fig. 8 is a detail perspective view of the handle shown in Fig. 7.

Fig. 9 is a fragmentary side elevational view showing a multi-unit package provided with another modified form of handle.

Fig. 10 is a detail perspective view of the handle shown in Fig. 9.

Fig. 11 is a fragmentary side elevational view showing a multi-unit package provided with another modified form of handle.

Fig. 12 is a detail perspective view of the handle shown in Fig. 11.

Fig. 13 is a fragmentary side elevational view showing a multi-unit package provided with another modified form of handle in the form of a loop of twine, rope, wire, or other flexible material.

Fig. 14 is a detail perspective view of the handle shown in Fig. 13.

Fig. 15 is a fragmentary side elevational view showing a multi-unit package provided with another modified form of handle in the form of a strip of flexible material secured at its ends to the package.

Fig. 16 is a detail perspective view of the handle shown in Fig. 15.

Figure 17:
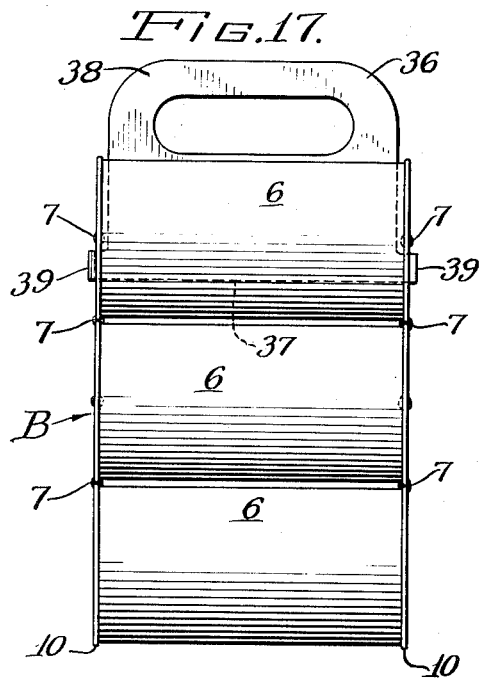

Fig. 17 is a side elevational view showing a multi-unit package provided with another modified form of handle.

Figure 18:
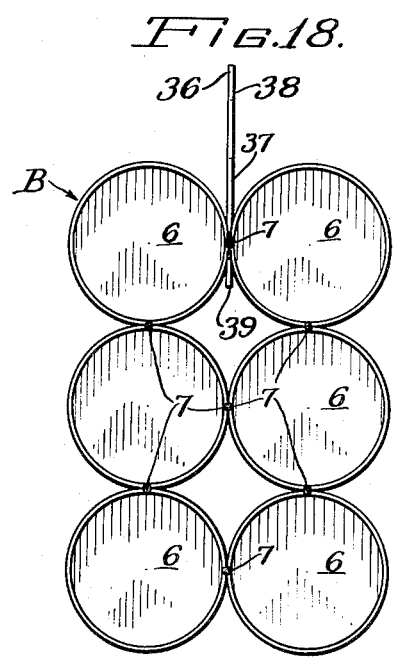

Fig. 18 is an end view of same.

Figure 19:
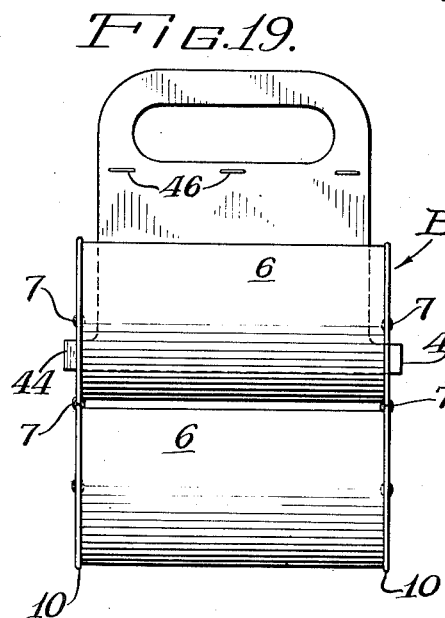

Fig. 19 is a side elevational view showing a multi-unit package provided with another modified form of handle.

Figure 20:
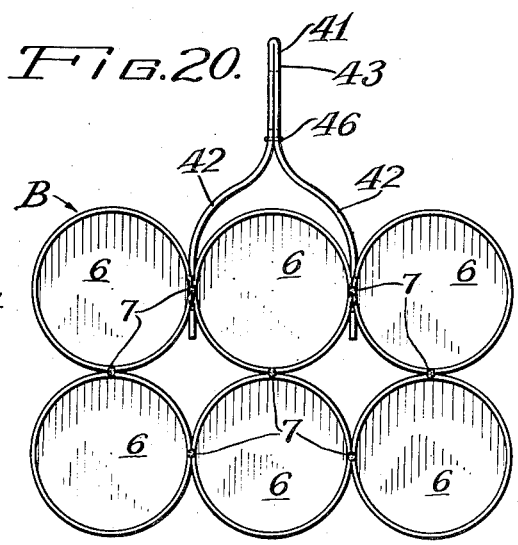

Fig. 20 is an end view of same.

Fig. 21 is a side elevational view showing a handle as applied to a multi-unit package of frustro-conical containers.

Fig. 22 is an end elevational view showing a multi-unit package provided with another modified form of handle.

Fig. 23 is an end elevational view showing a multi-unit package provided with another modified form of handle.

Fig. 24 is a side elevational view illustrating the manner in which a handle may be adhesively united to a multi-unit package of square or rectangular-shaped containers formed of cardboard or other material.

Fig. 25 is a top plan view of same.

Referring now to the drawings for a better understanding of this invention, and more particularly to Figs. 1 to 4 therein, the multi-unit package and handle are shown as comprising a plurality of cylindrical containers 6, formed of any suitable material and disposed in side-by-side abutting relation. To form the containers 6 into a multi-unit package A, the rim portions at one end of adjacent containers are welded, soldered, brazed, glued or otherwise secured together at their points of contact to provide a rupturable bond 7. Prior to the bonding operation, a handle 8 is disposed between adjacent containers in the manner illustrated in Figs. 1 and 2 in the drawings. The handle 8 is shown as blanked from flexible sheet material, such as cardboard, to provide an elongated base portion 9 and a hand-engaging strap portion 11. The elongated base portion 9 is adapted to extend between adjacent containers 6 below their upper rims 10 with the ends 12—12 of the base portion engaged within the converging recesses defined by adjacent containers.

When the containers are welded, glued, soldered or otherwise united together at their rims 10 to form a multi-unit package with the handle 8 affixed thereto, it will be noted, by referring to Fig. 1 in the drawings, that one of the rupturable bonds 7 is disposed to engage the upper medial edge portion of the base 9 of the handle to prevent upward displacement of the handle from the package A. After the package A has been assembled in the manner illustrated and described, the strap portion 11 of the handle 8 is adapted to be folded downwardly against the upper surfaces of the containers 6 along the hinge lines 13—13, as illustrated in dotted outline in Fig. 2.

A multi-unit package A, of the type described and illustrated in Figs. 1 to 4 in the drawings, is adapted to be supported by a customer by means of the handle 8. When an individually sealed container 6 is to be opened for use, it is pivoted upwardly relative to the other containers forming the multi-unit package A to thus rupture and break its bond 7.

Figs. 5 and 6 in the drawings illustrate a modified form of handle 14 for a group of containers having their rims 10 connected together by rupturable bonds 7 to form a multi-unit package A. This type of handle 14 is also preferably formed from flexible sheet material, such as cardboard, to provide an inverted U-shaped strap portion 16 hingedly connected at 17—17 to an elongated base portion 18, the handle having a center panel 15 hingedly connected to the strap portion at 15a. This form of the invention is otherwise similar to the form heretofore shown and described.

Figs. 7 and 8 in the drawings illustrate another modified form of handle 19 adapted to be blanked from sheet material, such as cardboard, to provide a strap portion 21 hingedly connected at 22—22 to a base portion 23, the handle having a center panel 20 hingedly connected at 20a to the strap portion 21. In this form of the invention the base portion 23 of the handle is coextensive in length to the strap portion 21.

Figs. 9 and 10 in the drawings illustrate another modified form of handle 24 for a multi-unit package A, the handle 24 being preferably blanked from sheet material, such as cardboard, to provide an arcuate strap portion 25 hingedly connected at 26—26 to an arcuate base portion 27 which is adapted to be engaged under a rupturable bond 7.

Figs. 11 and 12 in the drawings illustrate another modified form of handle 28 adapted for use in supporting a multi-unit package A, the handle 28 being preferably blanked from sheet material, such as cardboard, to provide an arcuate strap portion 29 hingedly connected at 30—30 to a straight base section 31 which is adapted to be engaged under a rupturable bond 7.

Figs. 13 and 14 in the drawings illustrate a further modified form of handle 32 for a multi-unit package A. This type of handle 32 comprises a ring formed of any suitable flexible material, such as wire, cotton, hemp, paper, synthetic fibers, etc., the ring handle 32 being adapted to engage a rupturable bond 7 of the multi-unit package A.

Figs. 15 and 16 in the drawings illustrate another modified form of handle 33 for a multi-unit package A, the handle comprising a strip of any suitable material secured at its ends 34—34 to the upper surfaces of a pair of containers 6—6.

Referring now to Figs. 17 and 18 in the drawings, a multi-unit package B is shown as comprising a plurality of containers 6 disposed in side-by-side abutting relation with their contacting rims 10 joined together by means of rupturable bonds 7. This form of multi-unit package is different from the forms heretofore shown and described in that the containers are joined together at both ends by means of rupturable bonds. A handle 36 blanked from flexible sheet material, such as cardboard, is provided with a base 37 and a strap portion 38. In this form of the invention, the base 37 is disposed parallel with the longitudinal axis of the containers and is arranged between a pair of the end containers of the package B with the strap portion 38 projecting outwardly from the sides of the containers 6. The base 37 is formed with a pair of outwardly projecting ears 39—39 for engagement under rupturable bonds 7—7 disposed at opposite ends of a pair of end containers. It will also be noted that the length of the base 37 is almost equal to the length of the containers 6 in order to dispose the side edges of the base adjacent the inner sides of the container rims 10—10 to prevent accidental displacement of the handle 36 from the multi-unit package.

Figs. 19 and 20 in the drawings illustrate another modified form of this invention in which the multi-unit package B is provided with a handle 41 blanked from sheet material, such as cardboard, and folded intermediate its ends to provide a pair of base portions 42—42 and a connecting strap portion 43. Each base portion 42 is provided with a pair of outwardly projecting ears 44—44 for engagement under rupturable bonds 7—7 provided between an intermediate container 6 and adjacent containers. If desired, the base sections 42—42 may be secured together adjacent the strap portion 43 by means of staples 46.

Fig. 21 in the drawings illustrates another modified form of this invention in which the multi-unit package B is provided with a handle 47 in the form of a strap of sheet material, such as cardboard, wrapped around the sides of two cans at the end of a package and stapled together at 48. The ends of the strip material are preferably formed with apertures 49 to receive the fingers of the person supporting the package.

Fig. 22 illustrates another modified form of this invention in which a strip of flexible sheet material 51 is wrapped around an intermediate container 6 of the multi-unit package B, the strip material being connected together adjacent its ends by means of staples 52. The ends of the strip 51 are also formed with hand-receiving apertures 53.

Figs. 24 and 25 in the drawings illustrate another modified form of this invention in which a multi-unit package C comprises a plurality of square or rectangular-shaped boxes 55 arranged in a group with a handle 56 interposed therebetween. The handle 56 is preferably formed from sheet material, such as cardboard, to provide an elongated base 57 and a strap 58. In this form of the invention the boxes 55 are adhesively united at 59 to the base 57 of the handle 56 to form rupturable bonds between the several boxes.

In each of the several forms of the invention herein shown and described, it will be noted that a plurality of independently sealed containers may be arranged in side-by-side abutting relation and joined together by means of rupturable bonds to form a multi-unit package capable of being supported by means of a simple and inexpensive handle. It is contemplated that the present invention is applicable to containers for various materials, such as, for example, beer, dog food, baby food, evaporated milk, soups, cereals, and the like which are usually purchased by the public in lots of from two to six packages.

While this invention has been shown in several forms, it is obvious to those skilled in the art that it is not so limited but is susceptible of various changes and modifications without departing from the spirit and scope of the claimed invention.

We claim as our invention:

1. In combination a multi-unit package comprising a plurality of individual sealed containers each having lateral walls, rims upon said containers which extend outwardly from the respective lateral walls of the containers, said containers being disposed with their lateral walls substantially parallel and with portions of rims of adjacent containers in substantial contact with each other, rupturable bonds joining said substantially contacting rim portions together at the points of substantial contact, and a handle comprising a relatively flat member and having an enclosed hand-gripping aperture, said handle including means engaging at least one of said bonds, said means being disposed between the lateral walls of adjacent containers, the portion of said handle provided with the hand-gripping aperture extending outwardly from said joined containers whereby said containers may be suspended from said handle.

2. In combination a multi-unit package comprising a plurality of individual sealed containers each having lateral walls, rims upon said containers which extend outwardly from the respective lateral walls of the containers, said containers being disposed with their lateral walls substantially parallel and spaced from each other and with portions of rims of adjacent containers in substantial contact with each other, rupturable bonds joining said substantially contacting rim portions together at the points of substantial contact, and a handle comprising a relatively flat member having an enclosed hand-gripping aperture, said handle including means engaging at least one of said bonds, said means being disposed between the lateral walls of adjacent containers, the portion of said handle provided with the hand-gripping aperture extending outwardly from said joined containers whereby said containers may be suspended from said handle.

3. In combination a multi-unit package comprising a plurality of individual sealed containers each having lateral walls, rims upon said containers which extend outwardly from the respective lateral walls of the containers, said containers being disposed with their lateral walls substantially parallel and spaced from each other and with portions of rims of adjacent containers in substantial contact with each other, rupturable bonds joining said substantially contacting rim portions together at the points of substantial contact, and a handle comprising a relatively flat member having an enclosed hand-gripping aperture, said handle including means engaging at least one of said bonds, said engaging means comprising oppositely projecting extensions, said extensions being disposed in the space between the lateral wall of the joined containers and beneath at least two of said bonds, the portion of said handle provided with the hand-gripping aperture extending outwardly from said joined containers whereby said containers may be suspended from said handle.

4. In combination a multi-unit package comprising a plurality of individual sealed containers each having lateral walls, rims upon said containers which extend outwardly from the respective lateral walls of the containers, said containers being disposed with their lateral walls substantially parallel and spaced from each other and with portions of rims of adjacent containers in substantial contact with each other, rupturable bonds joining said substantially contacting rim portions together at the points of substantial contact, and a handle comprising a relatively flat member having an enclosed hand-gripping aperture, a portion of said handle being disposed in the space between adjacent containers, at least one of said bonds being linked with the aperture in said handle for suspended engagement with said handle, the major portion of the handle including the hand-gripping aperture extending outwardly from said joined containers whereby said containers may be suspended from said handle.

5. In combination a multi-unit package comprising a plurality of individual sealed containers each having lateral walls, rims upon said containers which extend outwardly from the respective lateral walls of the containers, said containers being disposed with their lateral walls substantially parallel and spaced from each other and with portions of rims of adjacent containers in substantial contact with each other, rupturable bonds joining said substantially contacting rim portions together at the points of substantial contact, and a handle comprising a relatively flat member having an enclosed hand-gripping aperture, said handle also comprising engaging means positioned in the space between adjacent containers and limited with respect to slidable movement in said space by at least one of said bonds, the portion of the handle provided with the hand-gripping aperture extending outwardly from said joined containers whereby said containers may be suspended from said handle.

6. In a multi-unit package, two rows of individually sealed containers having rim portions in contacting engagement, the rim portions of adjacent containers being joined together by rupturable bonds, a handle comprising a base and a hand gripping portion, at least a portion of said base being disposed between said two rows of containers and interlocked therewith by at least one of said rupturable bonds, said hand gripping portion having a finger receiving aperture having its center disposed in a vertical plane passing through the center of gravity of the group of containers.

7. In a multi-unit package, two rows of individually sealed containers having rim portions in contacting engagement, the rim portions of adjacent containers being joined together by rupturable bonds, a handle comprising a base and a hand gripping portion, at least a portion of said base being disposed between said two rows of containers and interlocked therewith by at least one of said rupturable bonds, said hand gripping portion having a finger receiving aperture having its center disposed in a vertical plane passing through the center of gravity of the group of containers, said handle being formed of flexible material whereby the hand gripping portion may be folded toward the containers.

References Cited in the file of this patent

UNITED STATES PATENTS

| Number | Name | Date |
|---|---|---|
| 1,571,049 | Gatchell | Jan. 26, 1926 |
| 1,772,009 | Lackey | Aug. 5, 1930 |
| 2,128,509 | Swope | Aug. 30, 1938 |
| 2,287,731 | Franks et al. | June 23, 1942 |
| 2,396,473 | Powell | Mar. 12, 1946 |
| 2,568,436 | Faria | Sept. 18, 1951 |